Patented Oct. 19, 1943

2,332,074

UNITED STATES PATENT OFFICE 2,332,074

PLASTIC SHORTENING MIX

Enoch L. Griffith, Chicago, Ill., assignor to The Griffith Laboratories, Inc., Chicago, Ill., a corporation of Illinois No Drawing. Application October 6, 1941, Serial No. 413,806

4 Claims. (Cl. 99—123)

The present invention relates to a stable plastic shortening mix, particularly useful for providing shortening for holding moisture in commercial loaves of bread.

For many years, lard had been the customary shortening for bread, and it served to hold the moisture in bread. Later vegetable oils such as corn oil and cotton seed oil came into preferred use to lubricate the loaf in baking. In more modern times, with hydrogenation of the vegetable oils, there resulted the use of incompletely hydrogenated oils to raise the melting point of shortening, such as that of the former lard at 85° to 90° F., to a temperature in the range from 96° to 104° F. This kind of shortening gave a plastic fat as a raw material much like lard, but with less tendency to rancidify, and useful like lard. It has a tendency to granulate in storage and at bake-shop temperatures, and therefore it is not dependable in regard to texture and uniformity.

It is an object of the present invention to provide a shortening mix suitable for bread, which may be used in the customary way, pound for pound of lard or the above mentioned hydrogenated oils, which mix is plastic like lard and stable against granulation or change in texture in storage or transit, and at bake-shop temperatures.

It is a particular object of the invention to make a shortening mixture of high melting and lower melting fats with sufficient dry gelatinized starch granules to hold the fats in stable suspension in a plastic meltable mix having the aforesaid properties as a mix and having the property of storing fat in the baking loaf against the time when the baking heat begins to reduce the fats to lubricate the loaf.

Further objects are to provide an improved shortening composition to yield an improved commercial loaf of bread, which when cooled remains in a non-melting form in an improved state of preservation to hold moisture, especially in a sliced loaf, when it is held in a store, or in the family bread box.

The advent of slicing commercial loaves makes it more desirable to improve the retained freshness of bread and to preserve moisture therein. I have found that the presence of a considerable quantity of a high melting fat in the shortening improves the process and the product but only when it is properly distributed in the dough. But when it is equally distributed it forms thin films in the total volume, resisting air-penetration and drying. Fat of a high melting point is not easily incorporated unless it is prepared in a plastic mix when the dough batch is formed.

In the present invention such high melting fat is mixed with lower melting fat, whereby the mixture is plastic and useful like lard and has a melting point suitable for use in the ordinary methods of making dough, but higher than that now found in the commonly used incompletely hydrogenated vegetable oils. In other words a lower melting fat is used as an initial vehicle to disperse the higher melting fat.

Then this fat mixture is dispersed with approximately an equal amount of gelatinized starch, such as gelatinized corn starch. The starch serves as an absorbent and as a stabilizer for the mix, providing a smooth fat having the ability to soften with heat and to stiffen with cold, and the ability to melt, while lacking the tendency to granulate with such bakery temperature changes.

Additional ingredients may be added to the plastic mix where the product is to be used in bread, such as salt, yeast food or stimulants, and lecithin as an anti-oxidant and preservative.

When the term "gelatinized starch" is used, it is to be understood that this is a flour of heat-processed starch grains, which flour has the property of swelling immediately to a gelatinous mass on contact with water. Commonly, it is a highly absorbent corn flour, made by steaming and flaking corn grits and subsequently drying and powdering. The starch grains are thereby broken and the cells are disrupted. To make the processed or absorbent corn flour, the outer coat and germ of corn are removed producing hard granules called corn grits. These are steamed and flaked between heated rolls at high steam pressure, causing the starch cells to pop or burst, greatly increasing the absorption, the action being similar to bursting starch cells in starch paste where a small amount of starch will make a large quantity of stiff paste. These granules of starch absorb the hard fats or stearine to make perfect distribution in the dough batch.

A wide range of fat mixtures may be employed, providing mixes exhibiting a melting point up to about 140° F. For example the low melting fat may be beef stearin melting at 115° to 120° F. with an equal amount of hydrogenated coconut oil or other higher stearin-type fat, melting at 140° to 160° F. About equal parts of melted fat mix and gel starch granules are mixed, and cooled with mixing to provide a smooth velvety plastic mass which is stable against change for long periods of time at temperatures short of the melting point.

For bread making the following composition has been successfully employed, in the usual formulas calling for from 4% to 6% of shortening based on the weight of flour.

| | |
|---|---|
| Hydrogenated oil (M. P. 98° F.) ____pounds__ | 226 |
| Hard fat (M. P. 140° F.) _____do____ | 30 |
| Dry gelatinized corn starch_____do____ | 265 |
| Sodium chloride_____do____ | 25 |
| Lecithin _____do____ | 1.5 |
| Calcium bromate_____ounces__ | 4 |

The above composition is a smooth plastic mass exhibiting no change in texture over long periods of time in transit and in storage, and on holding at bake-shop temperatures. It may be used exactly like lard or the common hydrogenated oils melting at about 100° F., using the same formulas and the same weight as shortening. The plastic shortening mix of my invention mixes readily into the dough formation, and the presence of the gelatinized starch granules assists in the mixing in compensation for the higher melting point of the mass. The gelatinizing of the starch improves the body of the dough and results in a loaf of greater firmness.

In the baking of the loaf the final melting of the fat is delayed to about 140° F. where the gluten expands in the heating, whereby the lubrication of the loaf is delayed to the last part of the baking process and becomes complete at about the time the crust becomes permanent. The delayed melting limits the exudation of fat into the crust, making a thinner crust, holding more of the fat in the loaf, and preserving moisture. The delayed lubrication results in a taller loaf. The retention of "freshness" is much longer than in like bread made with fat melting at 98° to 104° F.

The gelatinized starch in the composition may vary in proportions of fat and starch, within a range of 90 to 110 parts by weight of starch to 100 parts by weight of mixed fat. The fat should be such that there are at least 30 parts of a stearin type fat melting at 140° F. or higher to 250 parts or less of fat melting at 100° F.±4° F. or higher, but it should be understood that progressively less of the lower melting fat may be used where it melts higher than around said 100° F. and not over 120° F.

The following limiting fat compositions are given by way of defining the invention:

| | Parts by weight |
|---|---|
| A. Fat melting at 140° F_____ | 30 |
| Fat melting at 120° F_____ | 30 |
| B. Fat melting at 140° F_____ | 30 |
| Fat melting at 96° F_____ | 250 |

It is to be understood that as the melting point of the lower melting fat decreases from 120° F. it is permissible to increase the quantity of it, as indicated above.

From the foregoing it will be appreciated that a variety of embodiments and of modifications are possible, within the scope of the invention as defined in the appended claims.

I claim:

1. A stable plastic shortening fat mix comprising essentially a mixture of shortening fats and of dry flour of disrupted starch grains dispersed therein, said mixture consisting of from 90 to 110 parts by weight of dry flour to 100 parts by weight of fat, and said fat mixture consisting of 30 parts by weight of edible fat melting at a temperature in the range from 140° to 160° F. and a quantity of lower melting shortening fat in the range of from 30 to 250 parts by weight, the lower end of said range corresponding to fat melting in the vicinity of and not over 120° F., and the higher end of said range corresponding to fat melting in the vicinity of and not lower than 96° F.

2. A stable plastic shortening fat mix comprising about equal parts by weight of a shortening fat melting at 115° to 120° F. and a hydrogenated vegetable oil melting at 140° to 160° F., and dispersed therein dry disrupted starch grains.

3. A stable plastic shortening fat mix comprising about 226 parts by weight of a shortening fat melting at about 98° F., about 30 parts by weight of a hard edible fat melting at a temperature in the range from 140° to 160° F., and a dry flour of disrupted starch grains in the ratio of 90 to 110 parts by weight to 100 parts by weight of said fats.

4. A stable plastic shortening fat mix comprising essentially a mixture of shortening fats and of dry flour of disrupted starch grains dispersed therein, said fat mixture consisting of 30 parts by weight of edible fat melting at a temperature in the range from 140° to 160° F. and a quantity of lower melting shortening fat in the range from 30 to 250 parts by weight, the lower end of said range corresponding to fat melting in the vicinity of and not over 120° F., and the higher end of said range corresponding to fat melting in the vicinity of and not lower than 96° F.

ENOCH L. GRIFFITH.